United States Patent Office 3,288,817
Patented Nov. 29, 1966

3,288,817
17β-(N,N-DIALKYLHYDRAZINO)-5α-ANDROSTAN-3β-OLS, Δ⁵ AND N'-ALKYL DERIVATIVES CORRESPONDING AND INTERMEDIATES THERETO
Paul D. Klimstra, Northbrook, Ill., assignor to G. D. Searle & Co., Chicago, Ill., a corporation of Delaware
No Drawing. Filed Oct. 21, 1965, Ser. No. 500,207
10 Claims. (Cl. 260—397.5)

The present invention is concerned with novel steroidal hydrazines and, more particularly, with 17β-(N,N-dialkylhydrazino)-5α-androstan-3β-ols and the corresponding Δ⁵ and N'-alkyl derivatives which are encompassed by the following structural formula

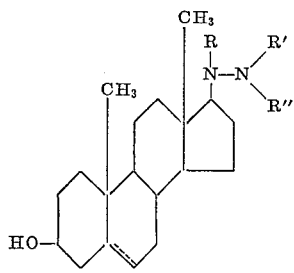

wherein R' and R" are lower alkyl radicals, R is hydrogen or a lower alkyl radical and the dotted line indicates that the linkage between carbon atoms 5 and 6 is either singly or doubly bonded.

Illustrative of the lower alkyl radicals represented by the R, R' and R" terms in the foregoing formula are methyl, ethyl, propyl, butyl, pentyl, hexyl, heptyl, and the branched-chain groups isomeric therewith.

The compounds of the present invention are conveniently manufactured by utilizing as starting materials substances of the following structural formula

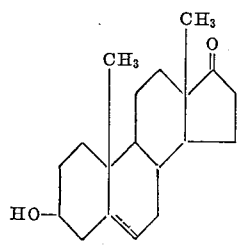

wherein the dotted line represents an optionally doubly bonded linkage between carbon atoms 5 and 6. Condensation of those starting materials with an unsymmetrical dialkylhydrazine results in the corresponding 17-dialkylhydrazono derivatives. Typically, 3β - hydroxyandrost-5-en-17-one is heated at the reflux temperature with unsymmetrical dimethylhydrazine to afford 17-dimethylhydrazonoandrost-5-en-3β-ol. Reduction of those hydrazono intermediates with a suitable reagent results in the corresponding 17β-(N,N-dialkylhydrazino) compounds. As a specific example, the aforementioned 17-dimethylhydrazonoandrost-5-en-3β-ol in methanol is heated with sodium borohydride to afford 17β-(N,N-dimethylhydrazino)androst-5-en-3β-ol.

The N,N,N'-trialkyl compounds of the present invention are conveniently obtained from the corresponding instant N,N-dialkyl substances. A method particularly suitable for manufacture of the N'-methyl derivatives involves reaction with formic acid and formaldehyde. The aforementioned 17β - (N,N-dimethylhydrazino)androst-5-en-3β-ol is thus heated under reflux with formic acid and formaldehyde to produce 17β-trimethylhydrazinoandrost-5-en-3β-ol. The N'-alkyl derivatives wherein the alkyl group contains more than one carbon atom are readily obtained by acylation of the corresponding N,N-dialkyl substance with a lower alkanoic acid anhydride or halide followed by reduction of the resulting acylated intermediates, typically with lithium aluminum hydride. In that manner, 17β-(N,N-dimethylhydrazino)androst-5-en-3β-ol is allowed to react at room temperature with acetic anhydride and pyridine to afford 17β-(N,N-dimethyl-N'-acetylhydrazino)androst-5-en-3β-ol 3-acetate, which is heated with lithium aluminum hydride in dioxane to yield 17β - (N,N-dimethyl - N' - ethylhydrazino)androst-5-en-3β-ol.

Saturation of the 5(6) double bond of the instant androst-5-en-3β-ols, suitably by catalytic hydrogenation, results in the instant 5α-androstan-3β-ols. As a specific example, 17β-trimethylhydrazinoandrost-5-en-3β-ol hydrochloride in ethanol is shaken with hydrogen in the presence of a platinum oxide catalyst, thus affording 17β-trimethylhydrazino-5α-androstan-3β-ol hydrochloride. Alkalization with sodium carbonate of an aqueous solution of that hydrochloride affords the free amine.

Equivalent to the instant hydrazines for the purposes of this invention are the corresponding non-toxic acid and quaternary salts which are exemplified by the citrate, tartrate, maleate, ascorbate, gluconate, lactate, succinate, phosphate, sulfate, hydrobromide, hydrochloride, methiodide, ethiodide, methochloride, methobromide, methosulfate and ethosulfate.

The compounds of this invention exhibit valuable pharmacological properties. They are, for example, hypocholesterolemic and anti-estrogenic agents. In addition, they are inhibitors of the enzyme pepsin. These compounds are useful also as anti-bacterial, anti-protozoal and anti-algal agents as evidenced by their ability to inhibit the growth of such organisms as *Diplococcus pneumoniae*, *Tetrahymena gelleii* and *Chlorella vulgaris*. They are inhibitors also of dicotyledenous seed germination.

The invention is illustrated more fully by the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples, temperatures are given in degrees Centigrade (°C.) and quantities of materials in parts by weight unless otherwise noted.

Example 1

A solution containing 15 parts of 3β-hydroxyandrost-5-en-17-one, 12 parts of unsymmetrical dimethylhydrazine and 120 parts of ethanol is heated at the reflux temperature for about 20 hours, then is cooled, diluted with water and stored at 0–5° until crystallization is complete. The resulting precipitate is collected by filtration and dried in air to afford 17-dimethylhydrazonoandrost-5-en-3β-ol, melting at about 158–159°. This compound is represented by the following structural formula

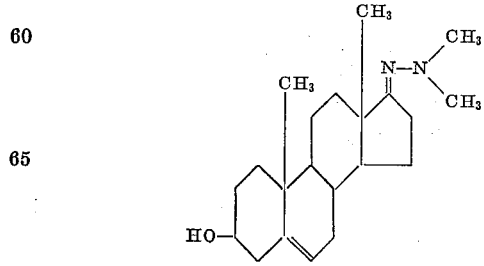

Example 2

To a solution of one part of 17-dimethylhydra-zonoandrost-5-en-3β-ol in 16 parts of methanol is added cautiously 5 parts of sodium borohydride, and the resulting reaction mixture is heated at the reflux temperature for about 45 minutes, then is cooled and poured carefully into water. The resulting precipitate is collected by filtration, washed with water on the filter and dried in air to afford the crude product. Recrystallization from aqueous methanol affords, as white crystals, 17β-(N,N-dimethylhydrazino)androst-5-en-3β-ol, melting at about 148–151°. This compound displays an optical rotation of —69° in chloroform and is further characterized by the following structural formula

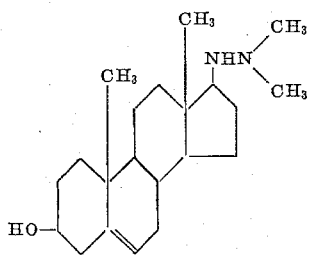

To an ethereal solution of 17β-(N,N-dimethylhydrazino)androst-5-en-3β-ol is added isopropanolic hydrogen chloride, and the resulting precipitate is collected by filtration and dried to afford 17β-(N,N-dimethylhydrazino)androst-5-en-3β-ol hydrochloride.

*Example 3*

The substitution of an equivalent quantity of unsymmetrical diethylhydrazine in the procedure of Example 1 results in 17-diethylhydrazonoandrost-5-en-3β-ol.

When an equivalent quantity of 17-diethylhydrazonoandrost-5-en-3β-ol is substituted in the procedure of Example 2, there is obtained 17β-(N,N-diethylhydrazino)androst-5-en-3β-ol.

*Example 4*

A mixture containing 3 parts of 17β-(N,N-dimethylhydrazino)androst-5-en-3β-ol, 2.44 parts of formic acid and 2 parts by volume of 30% aqueous formaldehyde is heated at the reflux temperature for about 6 hours, then is diluted with approximately 60 parts of methanol and poured carefully into a solution of 3 parts of sodium hydroxide in 10 parts of water. The resulting mixture is heated on the steam bath for about 10 minutes, then is poured into cold water. The precipitate which forms is collected by filtration, dried in air, then purified by recrystallization from aqueous acetone to afford 17β - trimethylhydrazinoandrost - 5 - en - 3β - ol, melting at about 160–162°. This compound is represented by the following structural formula

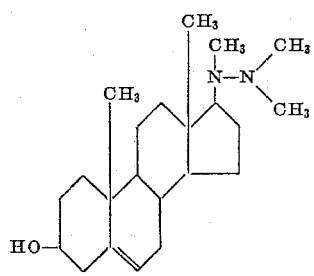

To an ethereal solution of 17β-trimethylhydrazinoandrost-5-en-3β-ol is added isopropanolic hydrogen chloride, and the resulting precipitate is purified by recrystallization from ethanol to afford 17β-trimethylhydrazinoandrost-5-en-3β-ol hydrochloride.

*Example 5*

A mixture of 4 parts of 17β-(N,N-dimethylhydrazino)androst-5-en-3β-ol, 21.6 parts of acetic anhydride and 40 parts of pyridine is kept at room temperature for about 18 hours, then is poured into 350 parts of water containing 20 parts of sodium acetate. That aqueous mixture is made alkaline by the addition of concentrated aqueous sodium carbonate, and the resulting precipitate is collected by filtration to afford 17β - (N,N - dimethyl-N'-acetylhydrazino)androst-5-en-3β-ol 3-acetate.

To a mixture of 1.6 parts of lithium aluminum hydride with 40 parts of dioxane is added, over a period of about 1½ hours with stirring, a solution of 3.2 parts of 17β-(N,N - dimethyl - N' - acetylhydrazino)androst - 5 - en - 3β-ol 3-acetate in 40 parts of dioxane. The resulting reaction mixture is heated at the reflux temperature for about 18 hours, then is treated successively with 1.6 parts of water dissolved in 15 parts of dioxane, 1.3 parts of 20% aqueous sodium hydroxide and 6 parts of water. The precipitated salts are removed by filtration and washed with dioxane. Distillation of the solvent from the filtrate, under reduced pressure, affords 17β-(N,N-dimethyl-N'-ethylhydrazino)androst-5-en-3β-ol. This compound is represented by the following structural formula

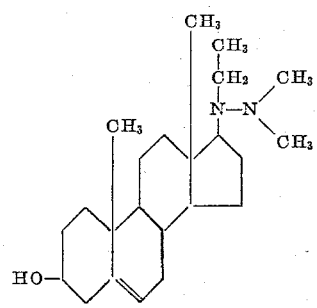

*Example 6*

When an equivalent quantity of 17β-(N,N-diethylhydrazino)androst-5-en-3β-ol is substituted in the procedure of Example 4, there is obtained 17β-(N,N-diethyl-N' - methylhydrazino)androst - 5 - en - 3β - ol, characterized by the following structural formula

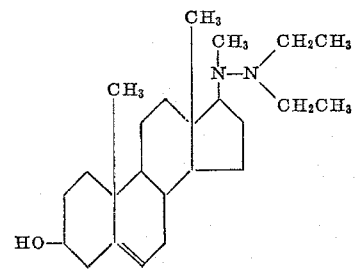

*Example 7*

To a solution of one part of 17β-trimethylhydrazinoandrost-5-en-3β-ol in 89 parts of ethanol is added 0.1 part of platinum oxide catalyst, and the resulting mixture is shaken with hydrogen at atmospheric pressure and room temperature until one molecular equivalent of hydrogen has been absorbed. Filtration of the mixture to remove the catalyst followed by evaporation of the solvent from the filtrate affords a white solid crude product which is purified by recrystallization from ethanol, thus producing 17β-trimethylhydrazino-5α-androstan-3β-ol hydrochloride.

To a solution of 6 parts of 17β-trimethylhydrazino-5α-androstan-3β-ol hydrochloride in 200 parts of ethanol is added a solution of 3 parts of sodium carbonate in 200 parts of water, and the resulting precipitate is collected by filtration, washed with water, and dried. Recrystallization of that crude product from aqueous acetone affords pure 17β-trimethylhydrazino - 5α - androstan-3β-ol, melting at about 151–153′ and exhibiting an optical rotation, in chloroform, of −65°. This compound is represented by the following structural formula

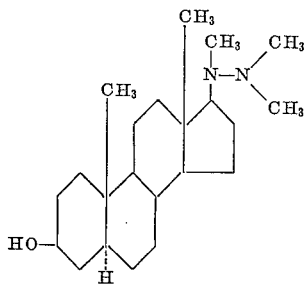

What is claimed is:
1. A compound of the formula

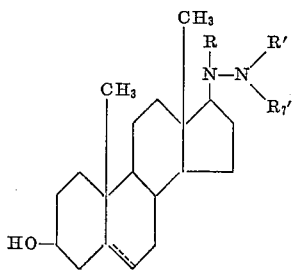

wherein R′ and R″ are lower alkyl radicals, R is selected from the group consisting of hydrogen and a lower alkyl radical and the dotted line represents an optionally double bonded linkage between carbon atoms 5 and 6.

2. A compound of the formula

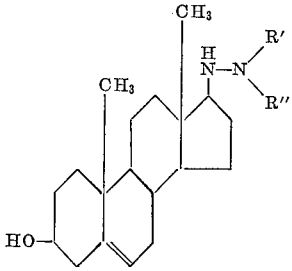

wherein R′ and R″ are lower alkyl radicals.
3. A compound of the formula

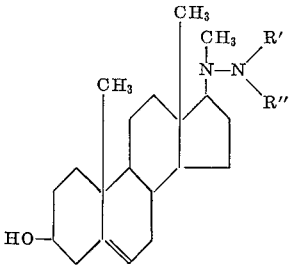

wherein R′ and R″ are lower alkyl radicals.
4. 17β-(N,N-dimethylhydrazino)androst-5-en-3β-ol.
5. 17β - (N,N - dimethylhydrazino)androst - 5 - en- 3β-ol hydrochloride.
6. 17β-trimethylhydrazinoandrost-5-en-3β-ol.
7. 17β - trimethylhydrazino - 5α - androstan - 3β - ol hydrochloride.
8. 17β-trimethylhydrazino-5α-androstan-3β-ol.
9. 17β - trimethylhydrazinoandrost - 5 - en - 3β - ol hydrochloride.
10. 17-dimethylhydrazonoandrost-5-en-3β-ol.

References Cited by the Examiner

Morrow et al., J. Org. Chem., 30, pages 579–587 (1965).

LEWIS GOTTS, *Primary Examiner.*

THOMAS M. MESHBESHER, *Assistant Examiner.*

UNITED STATES PATENT OFFICE
CERTIFICATE OF CORRECTION

Patent No. 3,288,817                                            November 29, 1966

Paul D. Klimstra

It is hereby certified that error appears in the above numbered patent requiring correction and that the said Letters Patent should read as corrected below.

Column 2, line 71, for "dimethylhydra-zonoan-" read -- dimethylhydrazonoan --; column 3, line 45, for "methano" read -- methanol --; column 4, line 65, for "89" read -- 80 --; column 5, line 8, for "151-153" read -- 151-153° --; lines 29 to 40, for the right-hand portion of the formula reading

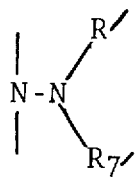         read         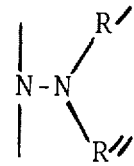

Signed and sealed this 19th day of September 1967.

(SEAL)
Attest:

ERNEST W. SWIDER
Attesting Officer

EDWARD J. BRENNER
Commissioner of Patents